United States Patent
Oberle et al.

(10) Patent No.: US 7,789,347 B2
(45) Date of Patent: Sep. 7, 2010

(54) DEVICE FOR ARTICULATING A DOOR OF A NACELLE OF AN AIRCRAFT AND NACELLE PROVIDED WITH SAID ARTICULATION DEVICE

(75) Inventors: Patrick Oberle, Verdun sur Garonne (FR); Joël Bourgault, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 175 days.

(21) Appl. No.: 11/802,132

(22) Filed: May 21, 2007

(65) Prior Publication Data
US 2007/0278345 A1    Dec. 6, 2007

(30) Foreign Application Priority Data
May 22, 2006    (FR) .................................. 06 51872

(51) Int. Cl.
*B64D 29/08* (2006.01)
*B64D 29/00* (2006.01)

(52) U.S. Cl. .................................. 244/129.4; 244/53 R

(58) Field of Classification Search ............... 244/54, 244/53 R, 53 B, 129.5, 129.4, 110 B, 113, 244/110 A, 110 R; 137/15.1, 15.2; 60/226.2, 60/230, 797, 798
See application file for complete search history.

(56) References Cited

U.S. PATENT DOCUMENTS

| 3,164,956 | A | * | 1/1965 | Colebrook et al. | .......... 244/113 |
| 5,181,677 | A | * | 1/1993 | Kaplan et al. | ............ 244/129.5 |
| 5,350,136 | A |   | 9/1994 | Prosser et al. |   |
| 6,220,546 | B1 | * | 4/2001 | Klamka et al. | ........... 244/129.4 |
| 6,311,928 | B1 | * | 11/2001 | Presz et al. | ............. 244/110 B |
| 6,334,730 | B1 | * | 1/2002 | Porte | ....................... 244/129.5 |
| 6,340,135 | B1 |   | 1/2002 | Barton |   |

FOREIGN PATENT DOCUMENTS

| EP | 0 744 339 | 11/1996 |
| FR | 2 622 930 | 5/1989 |
| GB | 2 288 578 | 10/1995 |

* cited by examiner

*Primary Examiner*—Tien Dinh
*Assistant Examiner*—Richard R Green
(74) *Attorney, Agent, or Firm*—Young & Thompson

(57) ABSTRACT

An articulation device connects a door (46) of an aircraft nacelle (30), the nacelle (30) including an external wall called a fairing including at least one opening (44) adapted to be closed by at least the door (46). The articulation device includes at least one arm (56) connected by a first pivotal axle (58) to the nacelle (30) and by a second pivotal axle (60) to the door (46), the two pivotal axles (58, 60) being substantially parallel.

7 Claims, 5 Drawing Sheets

DEVICE FOR ARTICULATING A DOOR OF A NACELLE OF AN AIRCRAFT AND NACELLE PROVIDED WITH SAID ARTICULATION DEVICE

FIELD OF THE INVENTION

The present invention relates to a device for the articulation of a good of an aircraft nacelle as well as an aircraft nacelle provided with said articulation device.

BACKGROUND OF THE INVENTION

The motors of aircraft are generally integrated within a structure, called in what follows a nacelle, connected by connection means to the aircraft, particularly by a mast to the wing.

This nacelle has several functions, particularly those of regulating and controlling the movements of the air about and in the motor so as to optimize the aerodynamic flows, to protect the motor from external elements, to attenuate sonic nuisance, to ventilate the internal zones, to take part in the distribution of mechanical forces of the motor and if desired to support systems for pressure reversal.

Finally, the nacelle should permit the routine maintenance and upkeep of the motor and its components.

To this end, the nacelle comprises, at the level of its external surface, an opening permitting access to the interior of the nacelle and a movable part adapted to occupy at least two positions, a first so-called closed position in which said movable part is disposed in prolongation of the external surface of the nacelle so as to close said opening, and a second position in which it frees at least partially the opening.

In what follows of the description, the movable portion is called a door.

In FIGS. 1 and 2, there is shown at 10 a nacelle connected by a mast 12 to a wing 14, said nacelle comprising a front air inlet 16 and a lateral fuselage 18 with a longitudinal axis 20. The nacelle 10 comprises at least one opening 22, preferably two disposed on each side, on opposite sides of the mast 12, adapted each to be closed respectively by a door 24.

According to the prior art, each door 24 is articulated relative to the upper edge of the opening 22 and pivots about an axis 26 substantially parallel to the axis 20 of the nacelle, disposed near the mast 12.

As a supplement, locking means are provided to hold the doors 24 closed. According to one embodiment, the lower ends of the doors are connected when these latter are in closed position, by bolts (not shown).

Preferably, as shown in FIG. 2, two props 28 are provided to hold each door in open position.

Even if this type of door is relatively simple and permits easy access to the elements mounted in the lower portion of the motor, it does not give complete satisfaction for the following reasons:

The positioning of the door in the open position facing the opening at the level of the medial portion of the upper portion, does not favor access to these parts. Thus, the operators must slide between the door and the motor first of all lowering themselves to pass below the panel of the door, taking the risk of injuring themselves against the edges of the door.

However, this manner of opening does not permit ensuring optimum safety to the operators. Thus, even if they are held by props, the doors can close abruptly, especially due to gusts of wind, and injure the operator disposed between the door and the motor.

As shown in FIG. 1, the upper portions of the existing articulated doors have a large wind profile even though the doors are dimensioned to resist wind gusts of the order of 100 Km/h. However, these stresses in the open position are much greater than those to which the doors are subjected in closed position. Thus, the doors are dimensioned for unusual use.

Finally, for a door of large size, its manipulation can be difficult, the operator having to raise said doors to effect the opening. In excess of certain dimensions, it is necessary to provide an onboard system for assisting opening and closing, complicating the design and increasing the installed weight of the aircraft.

Moreover, certain installation of propulsive systems, particularly of large size, can be relatively near the other portions of the aircraft, with configurations that can give rise to interference between the door in open position and the air foil or the nose of the attack edge in deployed position, or any other fixed or movable surface. It is necessary in these cases to provide protection which add a further increase of weight and complexity to the aircraft.

Also, the present invention seeks to overcome the drawbacks of the prior art by providing an articulation device for a door of an aircraft nacelle, permitting freeing in an optimum manner the opening and rendering the intervention of the operators more certain, and possibly lightening the nacelle.

SUMMARY OF THE INVENTION

To this end, the invention has for its object an articulation device connecting a door of an aircraft nacelle, said nacelle comprising an external wall called fairing comprising at least one opening adapted to be closed by at least one said door, characterized in that the articulation device comprises at least one arm connected by means of a first pivotal axis to a nacelle and by means of a second pivotal axis to the door, the two pivotal axes being substantially parallel.

BRIEF DESCRIPTION OF THE DRAWINGS

Other characteristics and advantages will become apparent from the description which follows, of the invention, which description is given only by way of example, with respect to the accompanying drawings, in which.

DETAILED DESCRIPTION OF THE PREFERRED EMBODIMENTS

Figure 1:
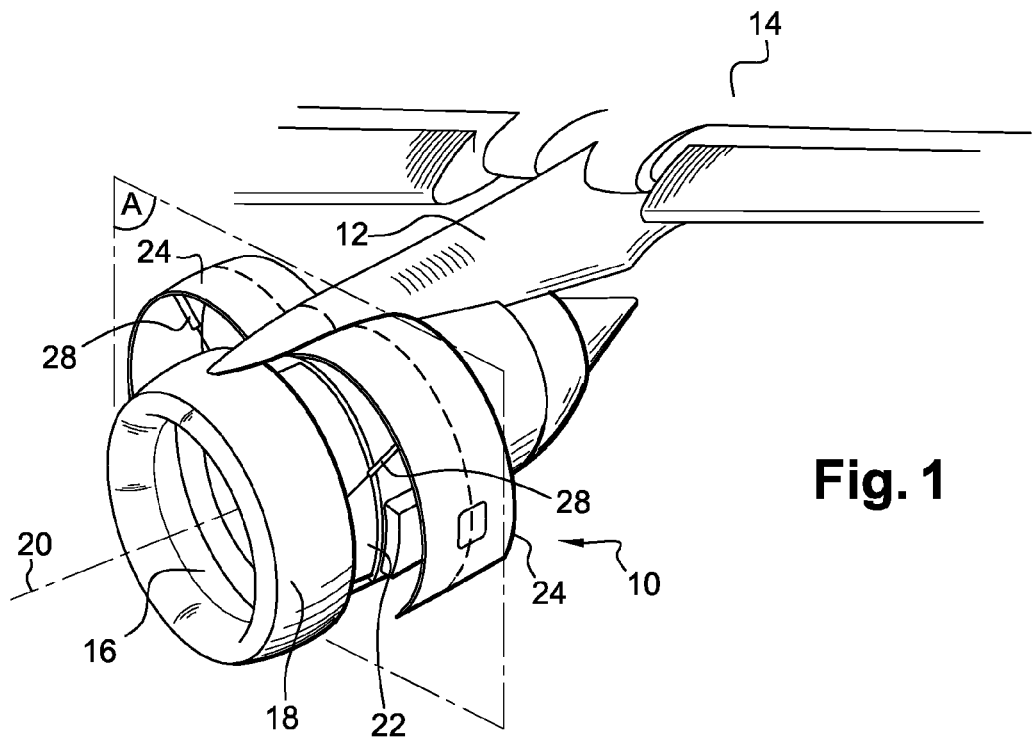
FIG. 1 is a perspective view of an aircraft nacelle according to the prior art.
Figure 2:
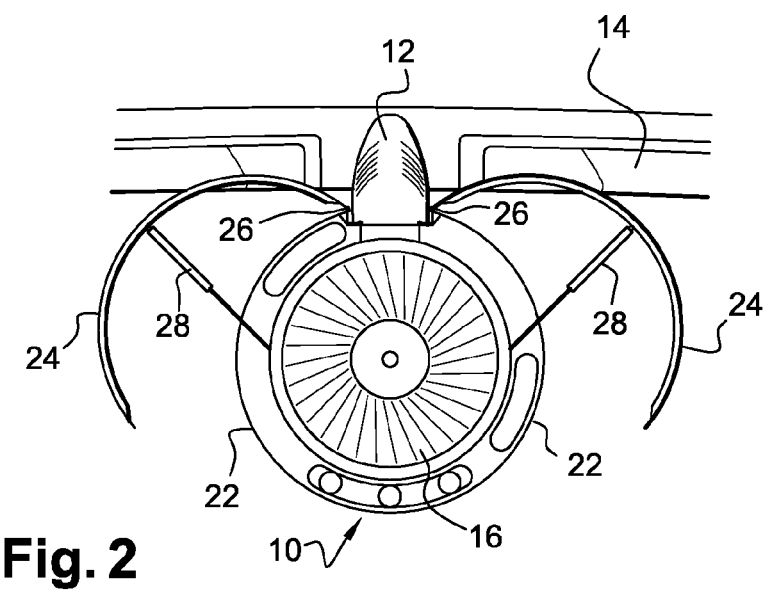
FIG. 2 is a cross-section in the plane A of FIG. 1, of an aircraft nacelle according to the prior art.
Figure 3:
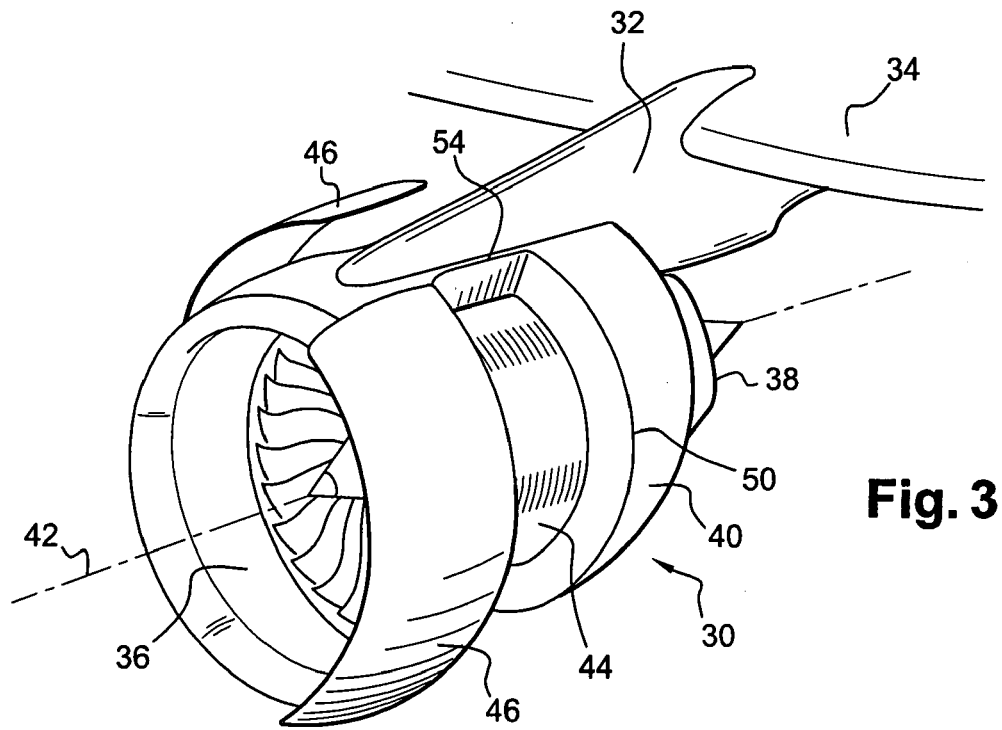
FIG. 3 is a perspective view of an aircraft nacelle comprising at least one door according to the invention.

In FIG. 3 there is shown at 30 an aircraft nacelle connected by means of a mast 32 to a wing 34. This nacelle comprises in the direction of the airflow an air inlet 36, a nozzle 38 connected by an external wall or frame 40 with substantially circular sections perpendicular to the longitudinal axis 42 of the nacelle, said nacelle comprising a motor.

However, the invention is not limited to this embodiment and covers all the different variations of material of the connecting elements between the nacelle and the rest of the aircraft, the anchoring region of the nacelle, the shapes, dimensions and materials of the nacelle, the type of motor and the emplacement of the motor.

Figure 5:
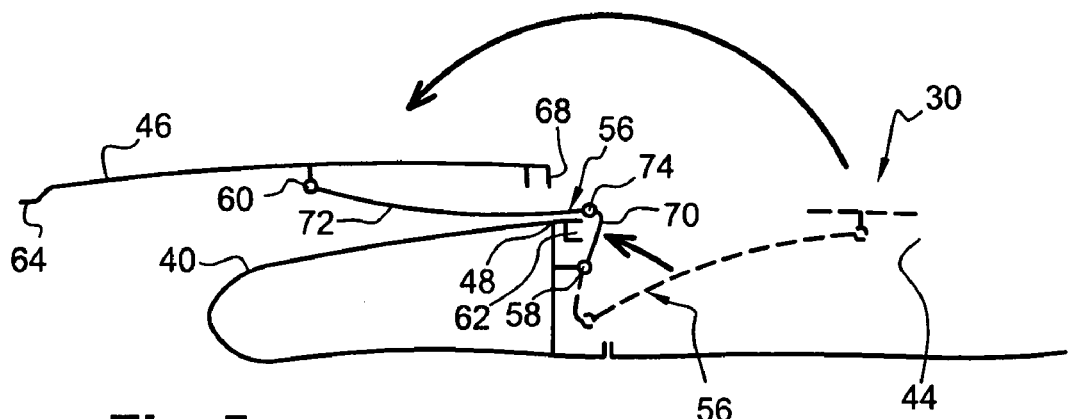
FIG. 5 is a schematic view in cross-section showing an aircraft nacelle door in open position according to a first embodiment of the invention.

So as to be able to act within the nacelle, below the fairing, and have access to the motor, to it components and/or its accessories, the nacelle comprises at the level of its fairing 40, at least one opening 44 adapted to be closed by at least one movable part called in what follows door 46. Thus, the door 46 is adapted to occupy a first position, called closed, in which it closes the opening and comes substantially into prolongation of the fairing so as to reduce disturbances in the air flow about the nacelle, and another position, called open, in which it frees at least in part the opening 40, as shown in FIGS. 3 and 5.

Preferably, the nacelle comprises two openings 44 and two corresponding doors 46 disposed on opposite sides of the mast, the doors extending from the mast to the lower part of the nacelle.

According to one configuration, the opening 44 has lateral edges in planes substantially perpendicular to the longitudinal axis 42 of the nacelle, a lateral front edge 48 and a lateral rear edge 50 (in the direction of air flow in the nacelle) and respectively lower 52 and upper 54 edges substantially parallel to the longitudinal axis 42 of the nacelle, the corresponding door 46 having shapes adapted to the opening.

Preferably, the doors do not comprise pressure reversers and are disposed at the level of the zones of fairing of the nacelle but do not comprise pressure reversers to the extent to which the reversers give rise to relatively great forces on the nacelle. On the contrary, if the pressure reversers give rise only to small forces compatible with the door, they can be disposed at the level of this latter.

So as to promote the relative movement of the door 46 relative to the nacelle 30, articulation means are provided.

These articulation means will now be described for a door, the other door or doors having the same articulation mechanism or another one.

According to the invention, the articulation means comprise at least one arm 56 connected by means of a first pivotal axle 58 to the nacelle and by means of a second pivotal axle 60 to the door 46, the two pivotal axles being substantially parallel. This arrangement permits spacing the door 46 from the nacelle so as to facilitate access to the opening.

Preferably, the first pivotal axle 58 is offset inwardly of the nacelle relative to the fairing and the arm 56 has a suitable shape, particularly an elbow, such that the door will be adapted to be disposed substantially parallel and adjacent the fairing of the nacelle in the open position, as shown in FIGS. 3 and 5.

Preferably, the length of the arm 56 and the position of the connection of said arm to the door are adjusted to the dimensions of the door 46 such that this latter will be offset relative to the opening 44 in the open position and entirely frees said opening. This configuration gives rise to better access to the opening. Moreover, according to this arrangement, the operator is not positioned between the nacelle and the door as in the prior art, which permits increasing his safety. Finally, the door 46 being substantially pressed against the fairing of the nacelle, it offers a lower wind resistance, which contributes to reducing the risk of abrupt closure and decreasing the weight of the door, this latter in open position being subjected to lower stresses connected with the wind.

According to one embodiment, the pivotal axles 58 and 60 are substantially parallel to the front lateral edge 48 of the opening, the first pivotal axle 58 being disposed at the level of the edge of the lateral front edge 48. The second pivotal axle 60 is provided substantially in the middle of the door.

The movement of the center of gravity of the door being located in a substantially horizontal plane, the risk of accidents caused by self closure of the door is extremely reduced compared to the kinematics of the prior art according to which the weight of the door has a tendency to cause self closure.

Preferably, the pivotal axles 58 and 60 are slightly inclined relative to the vertical so as to obtain a stable open condition of the door and/or to facilitate the opening of the door thanks to the weight of said door.

According to another characteristic of the invention, the door comprises locking means to hold it in closed position.

To this end, the lateral front edge 48 of the opening comprises a first throat 62 whose opening is oriented rearwardly, adapted to receive the front lateral edge 64 of the door 46 and the rear lateral edge 50 of the opening comprises a second throat 66 whose opening is oriented radially outwardly of the nacelle, adapted to receive the rear lateral incurved edge 68 of the door 46.

As a supplement, the arm is in at least two portions having at least one degree of freedom relative to each other.

According to a first modification shown in FIGS. 4A, 4B, 4C and 5, the arm 56 comprises a first portion 70 articulated relative to the nacelle, a second portion 72 articulated relative to the door and a third pivotal axle 74, connecting the two portions 70 and 72, substantially parallel to the pivotal axles 58 and 60.

According to another modification shown in FIGS. 8A to 8D, the arm 56 is telescopic and comprises a first portion 76 articulated relative to the nacelle, a second portion 78 articulated relative to the door, the portions 76 and 78 being sliding relative to each other.

The third arrangement according to the invention requires a door having at least three degrees of freedom, as shown in FIGS. 4A to 4C or 8A to 8D. Thus, the first modification comprises three degrees of freedom provided by articulations 58, 60 and 74. The second modification comprises three degrees of freedom provided by the two articulations 58 and 60 and translation between the portions 76 and 78.

This arrangement permits obtaining the immobilization of the door 46 in closed position, the forces exerted particularly by the air flow about the nacelle tending to hold the door in closed position.

Thus, in this case, the air flows tend to hold the lateral rear incurved edge 68 in the second throat 66 which prevents the door to move rearwardly and the retraction of the front lateral edge 64 of the first throat 62.

So as to ensure more certain locking, bolts can be provided to prevent the rear lateral edge 68 of the door to disengage from the second throat 66. This locking can be completed by adding bolts to prevent the door from recoiling. The bolts are preferably disposed at about half the height of the door, to remain accessible, two bolts disposed in the rear and two others in the front.

The bolts are not described further, because they can take different forms, forms already known and used in the prior art.

Figure 6:
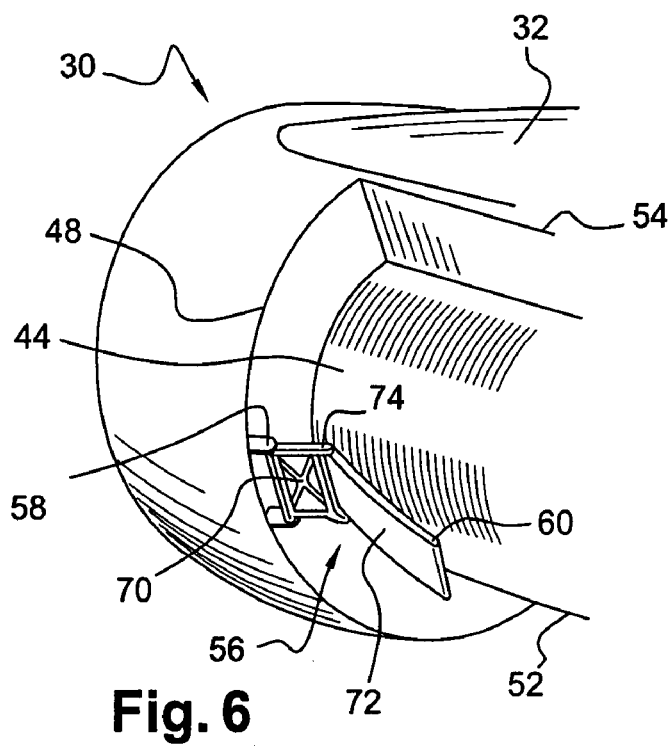
FIG. 6 is a perspective view showing the articulation device of the door of an aircraft according to the invention without the door.

In FIG. 6, there is shown an embodiment of the arm 56. The different portions of the arm as well as the articulations are dimensioned so as to absorb forces and the different stresses exerted particularly by the door. As shown in FIG. 6, the portions of the arm can be present in the form of a simple element such as the second portion 72 or with openings as in the first portion 70.

The positioning of the throats as well as the shapes of the lateral edges 64 and 68 of the door are determined such that the external surface of the door will be in prolongation of the fairing so as not to disturb the air flow about the nacelle when the door is closed.

Thus, the first throat 62 has a U shaped cross-section with one arm of the U disposed in prolongation of the fairing, the other arm being offset inwardly of the nacelle. As a supplement, the lateral front edge 64 of the door comprises a slight recess. Thus, when said edge 64 is disposed within the throat 62, the rest of the surface of the door is disposed in prolongation of the fairing of the nacelle.

As a modification, the front lateral edge 68 can be slid below the surface of the nacelle.

The second throat 66 also has a U shaped cross-section whose ends of the branches are offset inwardly of the nacelle such that when the door comes into contact with said throat or the end of the branches of the U, the external surface of the door will be in prolongation of the fairing of the nacelle. As a supplement, the rear lateral edge 68 of the door is bent to substantially 900 so as to coact with the second throat 66.

According to one embodiment, the first throat 62 can be prolonged at the level of the lower edge 52 and/or of the upper edge 54 of the opening. This configuration permits preventing the spacing of the door at the level of the upper and lower ends.

More generally, the front lateral edge of the door 46 and/or the front lateral edge of the opening 44 comprise means to prevent relative radial movement between these two elements and the side rear edge of the door 46 and/or the side rear edge of the opening 44 comprise means to prevent relative longitudinal movement (parallel to the axis of the nacelle) between these two elements.

The operation of the door will now be described with respect to FIGS. 4A to 4C, 5, 7A to 7F and 8A to 8D.

Figure 4A:
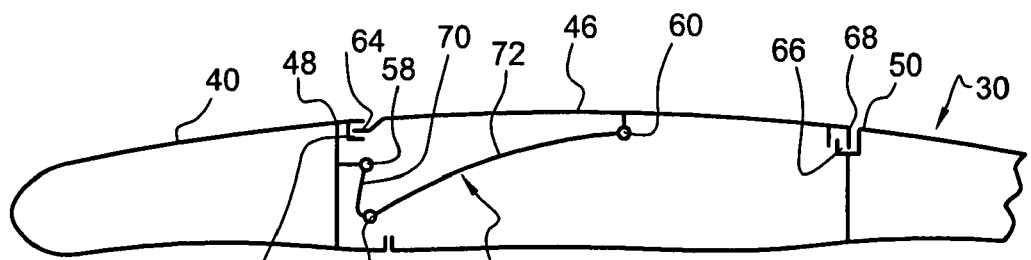
FIGS. 4A to 4C are schematic representations in cross-section showing the beginning of opening of an aircraft nacelle door according to a first embodiment of the invention.
Figure 7A:
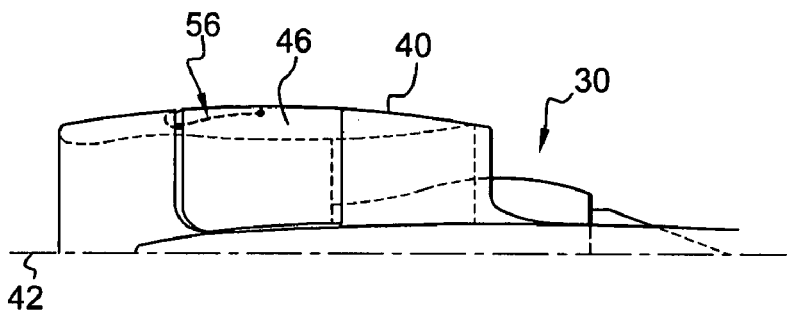
FIGS. 7A to 7F are half views from above, showing the different steps of the opening of a door of an aircraft nacelle according to the invention.
Figure 7B:
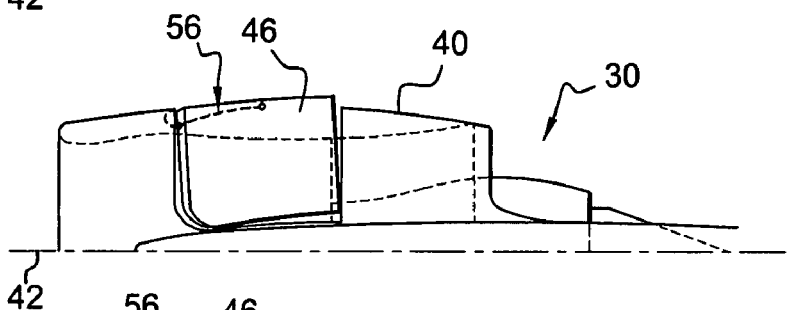
Figure 7C:
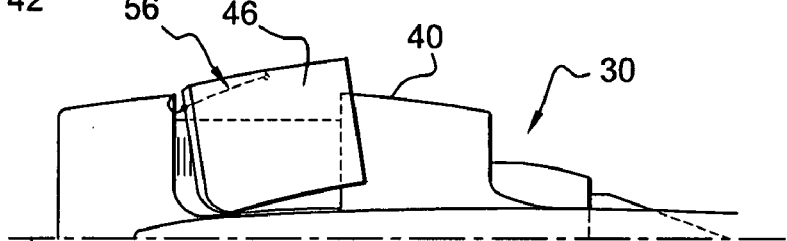
Figure 8A:
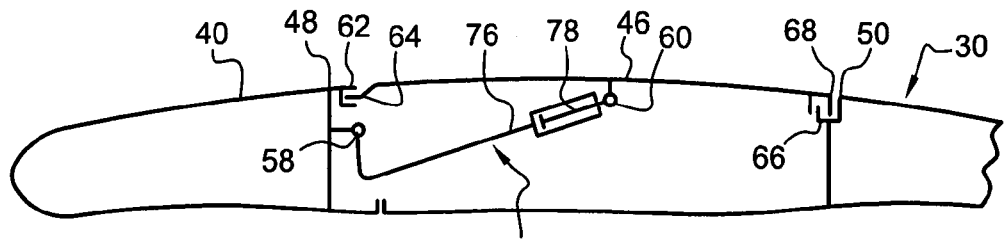
FIGS. 8A to 8D are schematic representations in cross-section showing the different stages of the opening movement of an aircraft nacelle door according to another embodiment of the invention.

In closed position, as shown in FIGS. 4A, 7A and 8A, the lateral edges 64, 68 of the door are engaged in their respective throats 62 and 66. In this position, the external surface of the door is disposed in prolongation of the fairing of the nacelle.

Once engaged in these two throats, the door cannot open with a simple movement.

Figure 4B:
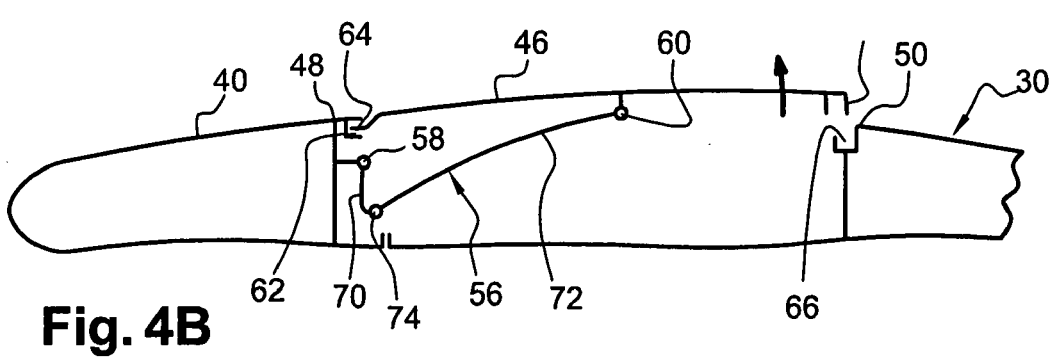
Figure 4C:
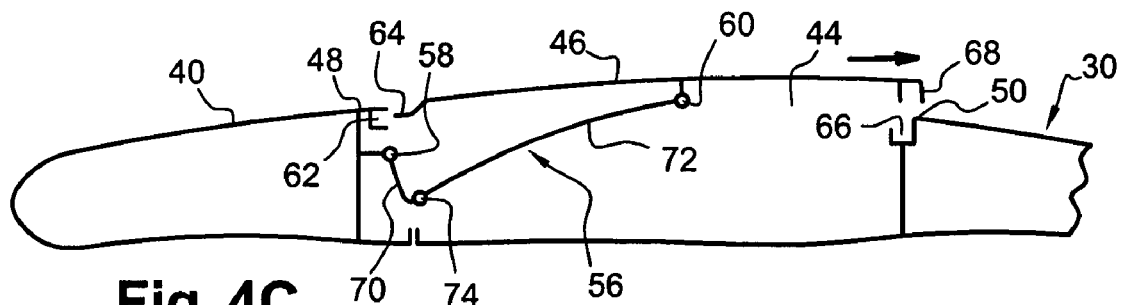
Figure 8B:
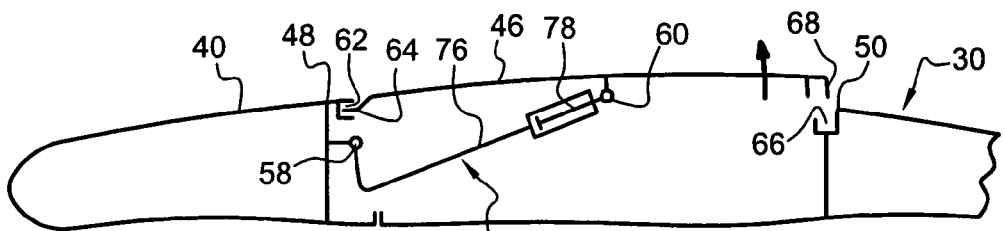
Figure 8C:
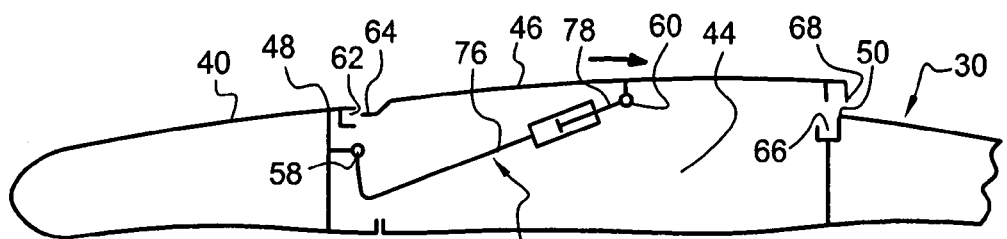

To open the door 46, after unlocking, the rear of the door has to be slightly pivoted, as shown in FIGS. 4B and 8B, so as to disengage the lateral rear edge 68 of the door from the second throat 66.

After this step, the door 46 can translate rearwardly, as shown in FIGS. 4C, 7B, 7C and 8C, so as to disengage the front lateral edge 64 from the first throat 62.

Figure 7D:
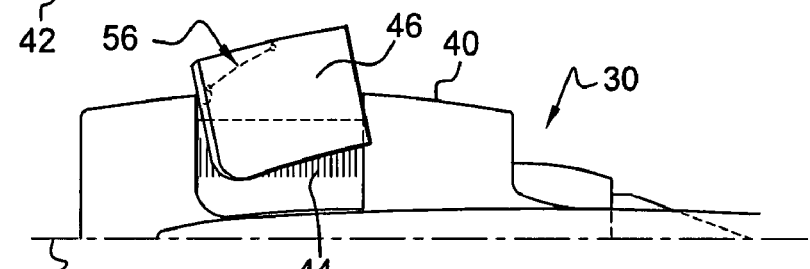
Figure 7E:
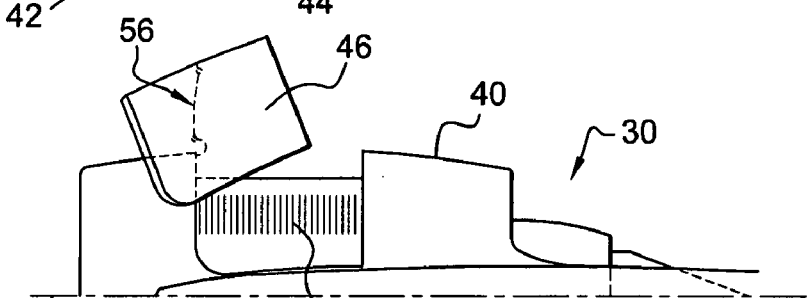
Figure 7F:
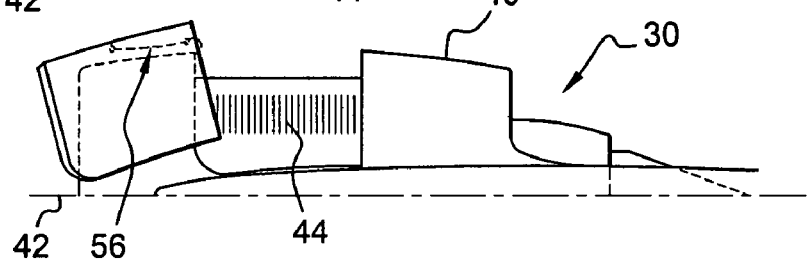
Figure 8D:
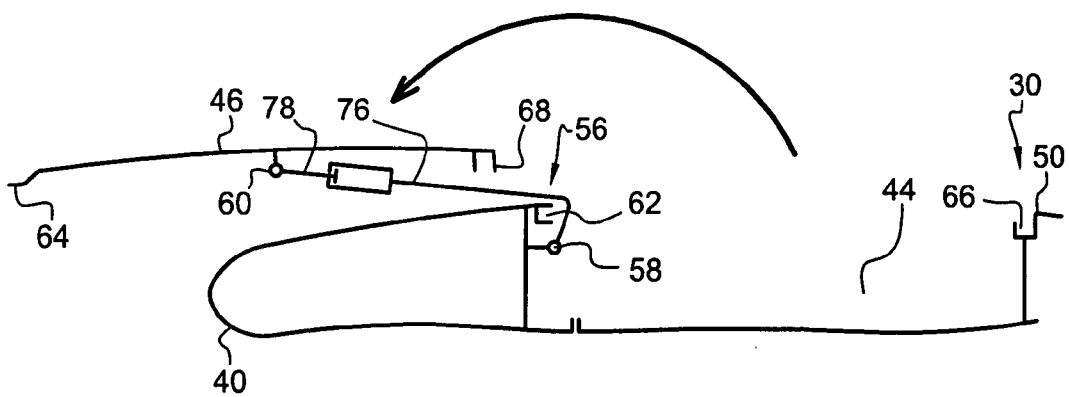

The door 46 can then pivot, as shown in FIGS. 7D and 7E, so as to come before the opening 44 in the open position, as shown in FIGS. 5, 7F and 8D.

To close the door, the above steps should be carried out in reverse order, by beginning with engagement of the lateral front edge in the first throat, then the lateral rear edge in the second throat and finally by locking the door in the closed position.

Preferably, alignment pins can be provided to facilitate the engagement of the lateral edges of the door in their respective throats.

Preferably, the internal surface of the door comprises buffers so as not to damage the fairing of the nacelle when the door is disposed in open position.

According to another characteristic, the arm comprises a first portion 70 shorter than the second portion 72. The shorter portion 70 permits small adjustments of the door as well as the clearance necessary to open the door completely. The longer portion 72 permits manipulating the door over wide movements.

The invention claimed is:

1. Aircraft nacelle comprising an external fairing comprising at least one opening adapted to be closed by a door, said aircraft nacelle being connected to said door by an articulation device, the articulation device comprising:
    at least one arm connected by a first pivotal axle to the nacelle and by a second pivotal axle to the door, the first and second pivotal axles being substantially parallel,
    said at least one arm comprising a first portion and a second portion movable relative to each other,
    wherein the first and second portions are connected to each other by a third pivotal axle,
    wherein the first portion is articulated to the nacelle through the first pivotal axle, the second portion is articulated to the door through the second pivotal axle, and said third pivotal axle extends substantially parallel to said first and said second pivotal axles and is not coaxial to said first and said second pivotal axles,
    wherein the door comprises a front lateral edge and a rear lateral edge, said rear lateral edge of the door being incurved,
    wherein the at least one opening comprises a front lateral edge and a rear lateral edge,
    wherein the front lateral edge of the at least one opening comprises a first throat having an opening oriented rearwardly, adapted to receive the front lateral edge of the door, said first throat having a U-shaped cross-section with a first arm of the U disposed in prolongation of the fairing, a second arm of the U being offset inwardly of the nacelle,
    wherein said front lateral edge of the door comprises a slight recess such that said front lateral edge of the door is disposed within the first throat, a rest of a surface of the door being disposed in prolongation of the fairing of the nacelle,
    wherein the rear lateral edge of the at least one opening comprises a second throat having an opening oriented radially outwardly of the nacelle, adapted to receive said incurved rear lateral edge of the door, and
    wherein the second throat has a U-shaped cross-section, ends of branches of the U are offset inwardly of the nacelle such that when the door comes into contact with said second throat or the end of the branches of the U, the external surface of the door will be in prolongation of the fairing of the nacelle,
    the rear lateral edge of the door being bent so as to co-act with the second throat.

2. The aircraft nacelle according to claim 1, wherein the first pivotal axle is offset inwardly of the nacelle and the at least one arm has an elbowed shape, such that the door will be adapted to be disposed substantially parallel and adjacent to the fairing of the nacelle in an open position.

3. The aircraft nacelle according to claim 1, wherein the first pivotal axle is disposed at a level of a front lateral edge of the at least one opening.

4. The aircraft nacelle according to claim 1, wherein at least one of the front lateral edge of the door and the front lateral edge of the at least one opening comprise means to prevent relative radial movement there between and at least one of the rear lateral edge of the door and the rear lateral edge of the at least one opening comprise means to prevent relative longitudinal movement there between.

5. An aircraft comprising a nacelle according to claim 1.

6. The aircraft nacelle according to claim 1, wherein the first and second pivotal axles are substantially vertical such that a center of gravity of the door moves in a substantially horizontal plane.

7. The aircraft nacelle according to claim 1, wherein said first and second pivotal axles are slightly inclined relative to the vertical so as to obtain at least one of a stable open position of the door and to facilitate the opening of the door due to a weight of said door.

* * * * *